US012773896B2

(12) United States Patent
Liu et al.

(10) Patent No.: US 12,773,896 B2
(45) Date of Patent: Oct. 27, 2026

(54) ELECTRIC DRIVE AXLE AND AN AUTOMOBILE

(71) Applicant: Jing-Jin Electric Technologies Co., Ltd., Beijing (CN)

(72) Inventors: Huaijin Liu, Beijing (CN); Zhengdong Li, Beijing (CN); Ping Yu, Beijing (CN); Jianwen Li, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 222 days.

(21) Appl. No.: 18/793,459

(22) Filed: Aug. 2, 2024

(65) Prior Publication Data

US 2026/0008328 A1 Jan. 8, 2026

(30) Foreign Application Priority Data

Jul. 3, 2024 (CN) ......................... 202410888615.6

(51) Int. Cl.

*F16H 37/08* (2006.01)
*B60K 1/00* (2006.01)
(Continued)

(52) U.S. Cl.

CPC ................ *B60K 1/00* (2013.01); *B60K 17/02* (2013.01); *B60K 17/165* (2013.01); (Continued)

(58) Field of Classification Search

CPC ........ B60K 1/00; B60K 17/02; B60K 17/165; B60K 2001/001; F16H 37/0813; (Continued)

(56) References Cited

U.S. PATENT DOCUMENTS 5,637,048 A * 6/1997 Maeda et al. .......... H02K 7/116 475/150
2021/0276409 A1* 9/2021 Devreese et al. .... B60K 7/0007
(Continued)

FOREIGN PATENT DOCUMENTS

| | | |
|---|---|---|
| CN | 109890642 A | 6/2019 |
| CN | 210416222 U | 4/2020 |
| EP | 4059753 A1 | 9/2022 |

OTHER PUBLICATIONS

European Search Report, mailed Apr. 7, 2025, from European Patent Application No. 24206701.5, 4 pages.
(Continued)

*Primary Examiner* — Edwin A Young
(74) *Attorney, Agent, or Firm* — Workman Nydegger

(57) ABSTRACT

An electric drive axle and an automobile are disclosed. The electric drive axle is transversely arranged on a chassis, and comprises a motor assembly, a reducer assembly, and a differential assembly. The motor assembly and the differential assembly are respectively arranged on two sides of the reducer assembly. The reducer assembly comprises a three-stage reduction mechanism. When operating in electric drive mode, a motor power is transmitted to the differential assembly after being decelerated by the three-stage reduction mechanism, and the differential assembly distributes and outputs the power to left and right wheels of a vehicle.

12 Claims, 1 Drawing Sheet

(51) Int. Cl.

| | |
|---|---|
| ***B60K 17/02*** | (2006.01) |
| ***B60K 17/16*** | (2006.01) |
| ***F16H 48/40*** | (2012.01) |
| ***F16H 57/037*** | (2012.01) |
| ***F16H 63/34*** | (2006.01) |
| *F16H 57/02* | (2012.01) |

(52) U.S. Cl.
CPC ......... *F16H 37/0813* (2013.01); *F16H 48/40* (2013.01); *F16H 57/037* (2013.01); *F16H 63/3416* (2013.01); *B60K 2001/001* (2013.01); *F16H 2057/02034* (2013.01); *F16H 2057/02052* (2013.01)

(58) Field of Classification Search
CPC ................... F16H 48/40; F16H 57/037; F16H 2057/02034; F16H 2057/02052; F16H 63/3416
See application file for complete search history.

(56) References Cited

U.S. PATENT DOCUMENTS

2022/0056992 A1 2/2022 Itou et al.
2022/0349460 A1* 11/2022 Yu et al. ................ F16H 48/34

OTHER PUBLICATIONS

European Communication pursuant to Article 94(3) EPC, mailed Apr. 23, 2025, from European Patent Application No. 24206701.5, 18 pages.

* cited by examiner

ELECTRIC DRIVE AXLE AND AN AUTOMOBILE

TECHNICAL FIELD

The present disclosure relates to the technical field of automobile power, and in particular to an electric drive axle and an automobile.

BACKGROUND

In the fields such as automobile power, for hybrid electric drive systems, the engine is needed to drive a generator as a backup power source. The engine and generator occupy most of the engine room. So the layout space of the electric drive axle is limited. The envelope shape of the electric drive axle is relatively special and resembles a dumbbell shape in which the space near wheels on two sides is larger, and the space in the middle part is smaller, and thus the layout of the electric drive axle is limited. In addition, the motor power is directly transmitted through the shaft to the differential, which increases the wear of the transmission mechanism and reduces the smoothness and stability of the electric drive axle. In addition, some vehicle models are four-wheel drive, and the power sources for two-wheel drive and four-wheel drive cannot be switched freely.

It should be noted that the description above only provides background information related to the present disclosure and does not necessarily constitute prior art.

SUMMARY

With respect to the above problems, the present disclosure provides an electric drive axle and an automobile that can overcome the above problems or at least partially solve the above problems.

The present disclosure adopts the following technical solutions.

A first aspect of the present disclosure provides an electric drive axle, the electric drive axle is transversely arranged on a chassis, and comprises a motor assembly, a reducer assembly, and a differential assembly, the motor assembly and the differential assembly are respectively arranged on two sides of the reducer assembly, and the reducer assembly comprises a three-stage reduction mechanism;

when operating in electric drive mode, a motor power is transmitted to the differential assembly after being decelerated by the three-stage reduction mechanism, and the differential assembly distributes and outputs the power to left and right wheels of a vehicle.

Preferably, the three-stage reduction mechanism comprises a first auxiliary shaft group and a second auxiliary shaft group; the first auxiliary shaft group comprises a first auxiliary shaft, a first stage large gear, and a second stage small gear; the second auxiliary shaft group comprises a second auxiliary shaft, a second stage large gear, and a third stage small gear; the first and second auxiliary shafts are parallel to a motor shaft, and the second stage small gear meshes with the second stage large gear.

Preferably, the motor assembly comprises a motor housing, a motor shaft, and a first stage small gear; the first stage small gear is integrated with the motor shaft and meshes with the first stage large gear.

Preferably, the differential assembly comprises a third stage large gear, an outer differential housing, an inner differential housing, a gear set, and a split clutch; the gear set is provided on the inner differential housing, the third stage large gear is integrated on the outer differential housing, and the inner differential housing is supported inside the outer differential housing by a needle roller bearing; the third stage large gear meshes with the third stage small gear;

the split clutch is provided between the inner differential housing and the outer differential housing, and the inner differential housing and the outer differential housing are locked to move together or separated to move independently by making the split clutch to perform a first or second action.

Preferably, the reducer assembly further comprises a reducer housing and a reducer cover that are connected by bolts.

Preferably, the electric drive axle further comprises a left axle tube and a right axle tube, wherein the left axle tube is fixedly connected to a left end surface of the motor housing, and the right axle tube is fixedly connected to a right end surface of the reducer cover.

Preferably, the electric drive axle further comprises a parking mechanism, wherein the parking mechanism comprises a parking arm and a parking gear; the parking gear is fixedly connected to the motor shaft and is provided on an outer side of the first stage small gear; the vehicle is controlled to be in a parking or a non-parking state by making the parking arm and the parking gear engage or disengage.

Preferably, the motor shaft comprises a hollow shaft, and the gear set comprises a left half shaft gear and a right half shaft gear.

Preferably, the electric drive axle further comprises a left output shaft and a right output shaft, wherein the left output shaft is connected to the left half shaft gear through the left axle tube and the hollow shaft, and the right output shaft is connected to the right half shaft gear through the right axle tube.

A second aspect of the present disclosure further provides an automobile comprising the electric drive axle as described in the first aspect.

The following beneficial effects can be achieved by at least one of the above technical solutions adopted in the present disclosure.

The three-stage reduction mechanism in the present disclosure reduces the length of the motor shaft, increases the stiffness of the motor shaft, reduces the bearing support structure, prevents the high-speed motor shaft from directly transmitting power to the differential gear set through a slender shaft, and improves stability. At the same time, in the electric drive axle, the motor and the differential are arranged on two sides of the reducer, the weight is evenly distributed on the left and right sides, and the structure is compact, which can meet the arrangement of a hybrid electric drive system with both an engine and a generator, or the arrangement of a pure electric system.

The above is only an overview of the technical solutions of the present disclosure. In order to make the technical means of the present disclosure to be better understood so that it can be implemented according to the contents of the description, and in order to make the above and other objects, features and advantages of the present disclosure clearer, the specific embodiments of the present disclosure are given below.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
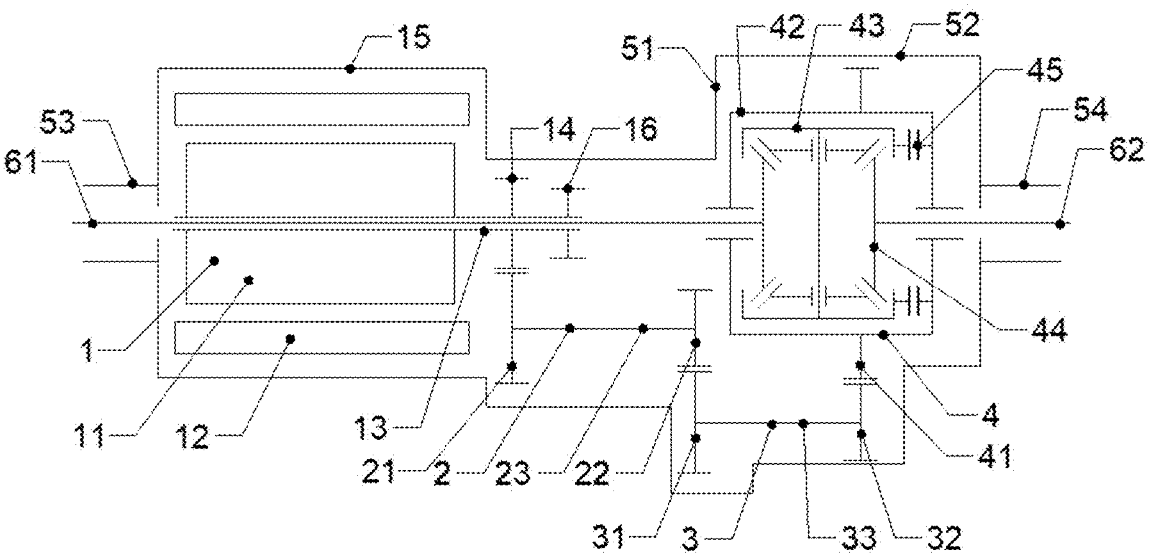
FIG. 1 is a schematic diagram of the structure of an electric drive axle according to an embodiment of the present disclosure.

In the drawings: 1, motor assembly; 11, motor rotor; 12, motor stator; 13, motor shaft; 14, first stage small gear; 15, motor housing; 16, parking gear; 2, first auxiliary shaft group; 21, first stage large gear; 22, second stage small gear; 23, first auxiliary shaft; 3, second auxiliary shaft group; 31, second stage large gear; 32, third stage small gear; 33, second auxiliary shaft; 4, differential assembly; 41, third stage large gear; 42, outer differential housing; 43, inner differential housing; 44, gear set; 45, split clutch; 51, reducer housing; 52, reducer cover; 53, left axle tube; 54, right axle tube; 61, left output shaft; 62, right output shaft.

DETAILED DESCRIPTION

In order to make the object, technical solutions, and advantages of the present disclosure clearer, the present disclosure will be described clearly and completely in conjunction with the specific embodiments and corresponding drawings. Obviously, the embodiments described are only part of rather than all of the embodiments of the present disclosure. Based on the embodiments in the present disclosure, all other embodiments obtained by those of ordinary skill in the art without paying creative work shall fall within the protection scope of the present disclosure.

The inventive concept of the present disclosure is, with respect to the current situation of unsatisfactory layout of electric drive axle structure and poor stability of transmission structure in the prior art, to design a highly universal electric drive axle which has a reasonable layout and balanced weight on left and right sides, and in which the reducer is a three-stage reduction mechanism, thereby reducing the length of the motor shaft, increasing the stiffness of the motor shaft, reducing the bearing support structure, and improving the stability of the electric drive axle.

The technical solutions provided by the embodiments of the present disclosure will be described in detail below in conjunction with the accompanying drawings.

Embodiments of the present disclosure provide an electric drive axle and a vehicle. FIG. 1 is a schematic diagram of the structure of the electric drive axle according to an embodiment of the present disclosure. The electric drive axle is transversely arranged on the chassis, and comprises a motor assembly 1, a reducer assembly, and a differential assembly 4. The motor assembly 1 and the differential assembly 4 are respectively arranged on two sides of the reducer assembly. The reducer assembly comprises a three-stage reduction mechanism. When operating in electric drive mode, the motor power is transmitted to the differential assembly after being decelerated by the three-stage reduction mechanism, and the differential assembly distributes and outputs the power to left and right wheels of the vehicle.

As shown in FIG. 1, the motor assembly comprises a motor rotor 11, a motor stator 12, a motor shaft 13, a first stage small gear 14, a motor housing 15, a parking gear 16, etc. The motor shaft 13 is a hollow shaft, the motor stator 12 is fixedly connected to motor housing 15, the motor rotor 11 is fixedly connected to the motor shaft 13, the first stage small gear 14 is integrated with the motor shaft 13, the parking gear 16 is fixedly connected to the motor shaft 13, and the parking gear 16 is provided on an outer side of the motor shaft 13. In the present disclosure, the motor shaft and the first stage small gear are integrally formed, no spline is needed, thereby reducing cumulative assembly errors and achieving high accuracy.

Figure 2:
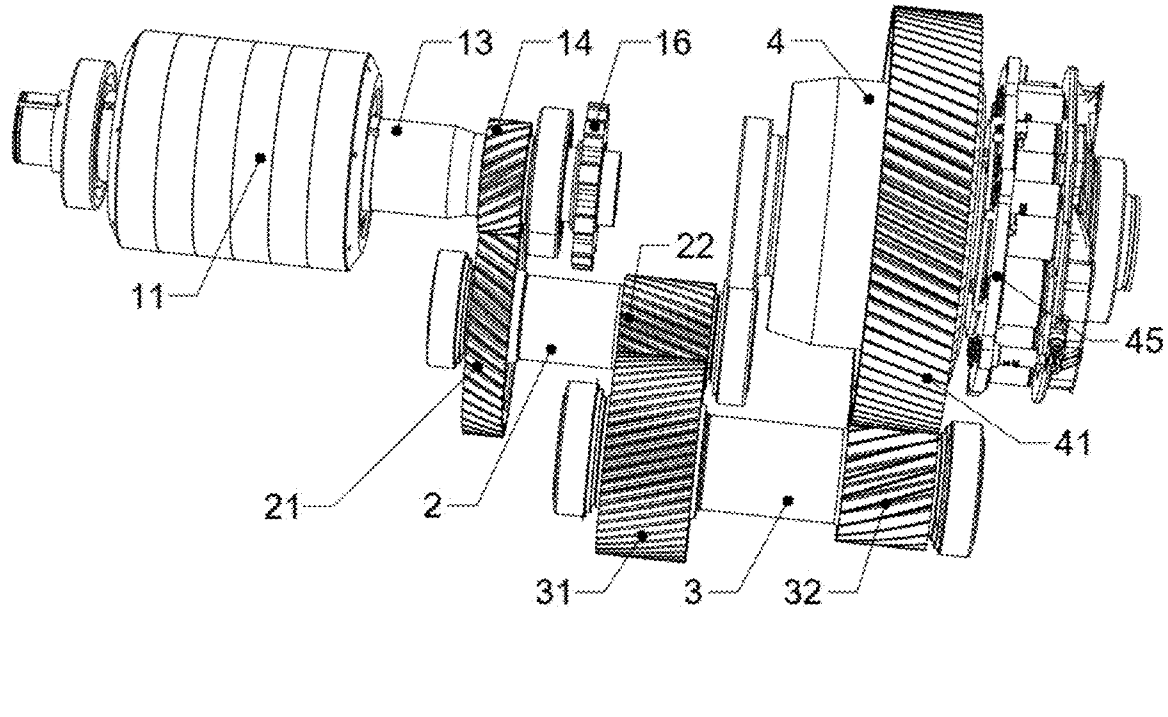
FIG. 2 is a schematic exploded diagram of an electric drive axle according to an embodiment of the present disclosure.

As shown in FIG. 2, the reducer assembly comprises a three-stage reduction mechanism, a reducer housing 51, and a reducer cover 52. The reducer housing 51 is connected to the motor housing 15 by bolts, and the reducer cover 52 is connected to the reducer housing 51 by bolts. The three-stage reduction mechanism comprises a first auxiliary shaft group 2 and a second auxiliary shaft group 3. The first auxiliary shaft group 2 comprises a first stage large gear 21, a second stage small gear 22, and a first auxiliary shaft 23. The second stage small gear 22, the first auxiliary shaft 23 and the first stage large gear 21 are integrally formed, or assembled and connected by spline. The second stage small gear 22 and the first stage large gear 21 are respectively provided at two ends of the first auxiliary shaft 23, and the diameter of the first stage large gear 21 is larger than that of the second stage small gear 22. The second auxiliary shaft group 3 comprises a second stage large gear 31, a third stage small gear 32, and a second auxiliary shaft 33. The third stage small gear 32, the second auxiliary shaft 33 and the second stage large gear 31 integrally formed, or assembled and connected by spline. The third stage small gear 32 and the second stage large gear 31 are respectively provided at two ends of the second auxiliary shaft 33, and the diameter of the second stage large gear 31 is larger than that of the third stage small gear 32.

As shown in FIG. 2, the differential assembly 4 comprises a third stage large gear 41, an outer differential housing 42, an inner differential housing 43, a gear set 44, and a split clutch 45. The gear set 44 comprises a left half shaft gear and a right half shaft gear. The third stage large gear 41 is connected to the outer differential housing 42, and the inner differential housing 43 is supported in the outer differential housing 42 through a needle roller bearing. The gear set 44 is installed on the inner differential housing, and the split clutch 45 is arranged between the outer differential housing 42 and the inner differential housing 43. When the split clutch 45 is engaged, the outer differential housing 42 and the inner differential housing 43 are locked together. The outer differential housing and the inner differential housing are connected for transmission, the outer differential housing transmits power to the inner differential housing and drives the differential to rotate. The differential further transmits the power to the left and right output shafts. At this point, the electric drive axle provides power to the wheels. When the clutch 45 is disengaged, the outer differential housing 42 and the inner differential housing 43 separate and can rotate independently. At this point, there is no transmission connection between the outer differential housing and the inner differential housing, and the outer differential housing does not transmit power to the inner differential housing. The power of the differential is cut off, and the electric drive axle does not provide power to the wheels. In sum, the differential assembly can quickly cut off or engage power of the differential, and has advantages such as high torque transmission efficiency, long service life, compact structure, and easy arrangement inside the vehicle.

In some embodiments of the present disclosure, the diameter of the first stage large gear 21 is greater than the diameter of the first stage small gear 14, the diameter of the second stage large gear 31 is greater than the diameter of the second stage small gear 22, the diameter of the third stage large gear 41 is greater than the diameter of the third stage small gear 32, and at the same time, the diameter of the third stage large gear 41 is greater than both the diameter of the first stage large gear 21 and the diameter of the second stage large gear 31.

As shown in FIGS. 1 and 2, the first auxiliary shaft 23 and the second auxiliary shaft 33 are parallel to the motor shaft 13, and the motor assembly and the differential assembly share the same axis, thereby ensuring transmission efficiency. The first stage small gear 14 located on the motor shaft 13 meshes with the first stage large gear 21 located on the first auxiliary shaft group 2, the second stage small gear 22 located on the first auxiliary shaft group 2 meshes with the second stage large gear 31 located on the second auxiliary shaft group 3, and the third stage small gear 32 located on the second auxiliary shaft group 3 meshes with the third stage large gear 41 located on the differential assembly 4. The first auxiliary shaft group 2 and the second auxiliary shaft group 3 are respectively fixed inside the reducer assembly through different bearings. Compared to the motor with three bearings, the design of the motor with two bearings in the present disclosure reduces the axial length and improves transmission efficiency. In the present disclosure, the first stage gear set is arranged near the motor side. The motor shaft is a small-diameter high-speed shaft to reduce the length of the motor shaft, which can improve the stiffness of the motor shaft, reduce the bearing support structure, and is more advantageous for high-speed bearing selection. The first auxiliary shaft group 2 transmits the motor power to the second stage gear set arranged on the right side after the first stage reduction, thereby preventing the high-speed motor shaft from directly transmitting power from the left side to the right gear set through a slender shaft. This makes the overall component design and bearing selection more reasonable, and improves reliability.

As shown in FIG. 1, the electric drive axle in the present disclosure further comprises a left axle tube 53 and a right axle tube 54. The left axle tube 53 is connected to the left end surface of the motor housing 51, and the right axle tube 54 is connected to the right end surface of the reducer cover 52. The left axle tube 53 and the right axle tube 54 are used to fix the electric drive axle to the chassis.

In the present disclosure, the electric drive axle further comprises a left output shaft 61 and a right output shaft 62. The left output shaft 61 passes through the center holes of the left axle tube 53 and the motor shaft 13 and is connected to the left half shaft gear of the differential assembly 4. The right output shaft 62 passes through the center hole of the right axle tube 54 and is connected to the right half shaft gear of the differential assembly 4. As shown in FIG. 1, the motor assembly 1 of the electric drive axle is arranged on the left side of the reducer assembly, and the differential assembly 4 is arranged on the right side of the reducer assembly. The electric drive axle adopts parallel shaft gear transmission, and the motor shaft 13, left output shaft 61, and right output shaft 62 are arranged on the same axis. The overall layout structure of the electric drive axle has a dumbbell-like shape, with two large ends and a small middle section. The motor housing and the reducer housing serve as the middle section of the entire electric drive axle, the motor and the differential are arranged on the left and right sides respectively, thereby ensuring the balance of weight on the left and right sides of the electric drive axle. The structure is simple, occupies smaller space, and has higher integration, and thus is suitable for the layout space requirement and split requirements of four-wheel drive of hybrid electric drive systems.

In some examples of the present disclosure, the electric drive axle further comprises a parking mechanism, which comprises a parking arm and a parking gear 16. The parking gear 16 is fixedly connected to the motor shaft and is provided on the outer side of the first stage small gear 14. The vehicle is controlled to be in a parking state or a non-parking state by making the parking arm and the parking gear 16 engage or disengage. During specific implementation, the parking gear 16 is fixedly connected to the motor shaft 13 of the motor assembly. When the parking arm of the parking mechanism is engaged with the parking gear 16, the rotation of the motor shaft is restricted, and the electric drive axle is in the P gear state. When the parking arm of the parking mechanism is disengaged from the parking gear, the motor shaft can rotate freely, and the electric drive axle is in a non-P gear state. The parking gear is arranged on the motor shaft, and has a small load, small volume, and light weight. The parking mechanism in the present disclosure is arranged on the motor shaft, and by cooperating with the transmission ratio of the gearbox, the parking mechanism can satisfy a larger wheel braking torque demand with a smaller weight and volume. At the same time, the small weight parking gear effectively improves the efficiency of the entire electric drive axle.

As a specific embodiment in the present disclosure, the electric drive axle is a transverse electric drive axle installed on the chassis. The reducer assembly is a three-stage parallel axis reducer. The motor shaft 13, the left output shaft 61, and the right output shaft 62 are arranged coaxially. The motor is located on the left side of the entire electric drive axle, and the reducer is located on the right side of the entire electric drive axle. The left axle tube 53 is connected and fixed to the left end face of the motor housing, and the right axle tube 54 is connected and fixed to the right end face of the reducer cover. Preferably, the left axle tube 53 is integrated with the left end face of the motor housing, and the right axle tube 54 is integrated with the right end face of the reducer cover. High strength and high toughness materials are used to optimize the cross-section thickness of the wall, optimize the stress distribution, reduce the weight, improve the overall performance consistency, and reduce post-welding stress deformation. The motor assembly, the reducer assembly, and the differential assembly (including the split clutch) are first assembled respectively and then combined together, thereby improving the manufacturing process. The split clutch and the differential are integrated together, and only part of the differential gear set and the inner differential housing rotate during splitting, thereby effectively reducing system losses, improving efficiency, and saving layout space.

In the present disclosure, the electric drive axle has multiple working modes. In the electric drive mode, the inner and outer differential housings are connected together through the split clutch. The motor power is transmitted to the outer differential housing after decelerated by the three-stage reducer, and then transmitted to the inner differential housing through the engaged split clutch. The power is then distributed through the differential gear set, and transmitted to the left output shaft and further to the left wheel and to the right output shaft and further to the right wheel for power output.

In the power generation mode, the inner and outer differential housings are connected together through the split clutch. The inertial power flows from the left and right wheels are transmitted to the differential through the left and right output shafts, respectively. The differential transmits the power flows to the inner differential housing, and then to the outer differential housing through the engaged split clutch. Finally, it is accelerated in three stages by the reducer and transmitted to the motor to drive the motor to generate electricity.

In the split mode (that is, two-wheel drive, without the need of the drive axle to work), the inner differential housing and the outer differential housing are separated by the split clutch. The inertia powers of the left and right wheels are transmitted to the differential gear set through the left and right output shafts, respectively. At this point, the split clutch is disengaged, and the power to the inner and outer differential housings is interrupted. The components between the outer differential housing and the motor shaft (the outer differential housing, the first auxiliary shaft group, the second auxiliary shaft group, and the motor shaft) stop rotating, and only the left and right wheels drive the left and right output shafts, the differential gear set, and the inner differential housing to rotate, thereby completely eliminating the motor loss caused by reverse dragging of the electric drive axle, and almost completely eliminating the transmission loss caused by reverse dragging of the electric drive axle, effectively reducing system losses and improving efficiency.

In some examples of the present disclosure, an automobile is also provided, which comprises the electric drive axle as described above. For other parts of the automobile, please refer to the prior art, and the present disclosure will not repeat.

It should be noted that, the terms “comprise”, “include” or any other variants used herein are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase “comprising a . . . ” does not exclude the case that there are other same elements in the process, method, article or apparatus including the element.

A person of ordinary skill in the art should understand that the embodiments of the present disclosure can be provided as methods, systems, or computer program products. Therefore, the present disclosure may take the form of a fully hardware implementation, a fully software implementation, or a combination of software and hardware implementation. Moreover, the present disclosure may take the form of a computer program product implemented on one or more computer usable storage media (including but not limited to disk storage, CD-ROM, optical storage, etc.) containing computer usable program code.

The above only describes the embodiments of the present disclosure, and is not intended to limit the present disclosure. For those skilled in the art, the present disclosure may have various modifications and variations. Any modification, equivalent substitution, improvement, etc. made in the spirit and principle of the present disclosure shall all fall within the protection scope of the present disclosure.

It should be noted that in the description of the present disclosure, the terms “first”, “second”, etc. are only used for descriptive purposes and should not be understood as indicating or implying relative importance. Furthermore, in the description of the present disclosure, unless otherwise specified, “multiple” or “a plurality of” means two or more.

In the present disclosure, unless otherwise specified and defined, the terms such as “installation”, “connection”, “fixation” should be understood in a broad sense, for example, it may be fixedly connected, or detachably connected, or integrally connected; it may also be mechanically connected, electrically connected, or communicated with each other; it may be directly connected or indirectly connected through a middleware; it may also be internally connected or interacted between two components. For a person of ordinary skill in the art, the specific meaning of these terms in the present disclosure should be understood according to specific situations.

In the present disclosure, unless otherwise specified and defined, a first feature is located “on” or “beneath” a second feature may be that the first and second features are in direct contact or in indirect contact through an intermediate medium. Moreover, the first feature is “above” the second feature may be that the first feature is directly or diagonally above the second feature, or only indicate that the first feature is horizontally higher than the second feature. The first feature “below” or “under” the second feature may be that the first feature is directly or diagonally below the second feature, or only indicate that the horizontal height of the first feature is less than that of the second feature.

The description of any process or method in a flowchart or otherwise described herein may be understood as comprising one or more modules, fragments, or portions of codes of executable instructions for implementing specific logical functions or procedures, and the scope of preferred embodiments of the present disclosure comprises other implementations, which may not be in the order shown or discussed, including performing functions in a fundamentally simultaneous manner or in reverse order based on the functions involved. This should be understood by those skilled in the art.

In the description of this specification, terms such as “an embodiment”, “some embodiments”, “an example”, “a specific example”, or “some examples” means that the specific features, structures, materials, or features described in conjunction with the embodiments or examples are included in at least one embodiment or example of the present disclosure. In this specification, the illustrative description of the above terms may not necessarily refer to the same embodiment or example. Moreover, the specific features, structures, materials, or characteristics described can be combined in an appropriate manner in any one or more embodiments or examples.

Although embodiments of the present disclosure have been shown and described above, it can be understood that the above embodiments are exemplary and cannot be understood as a limitation of the present disclosure. A person of ordinary skill in the art may make changes, modifications, substitutions, and variations to the above embodiments within the scope of the present disclosure.

What is claimed is:

1. An electric drive axle, wherein the electric drive axle is transversely arranged on a chassis, and comprises a motor assembly, a reducer assembly, and a differential assembly, the motor assembly and the differential assembly are respectively arranged on two sides of the reducer assembly, and the reducer assembly comprises a three-stage reduction mechanism;

when operating in an electric drive mode, a motor power is transmitted to the differential assembly after being decelerated by the three-stage reduction mechanism, and the differential assembly distributes and outputs the power to left and right wheels of a vehicle, wherein:

the three-stage reduction mechanism comprises a first auxiliary shaft group and a second auxiliary shaft group, the first auxiliary shaft group comprises a first auxiliary shaft, a first stage large gear, and a second stage small gear, the second auxiliary shaft group comprises a second auxiliary shaft, a second stage large gear, and a third stage small gear, the first and second auxiliary shafts are parallel to a motor shaft, and the second stage small gear meshes with the second stage large gear;

wherein:

the motor assembly comprises a motor housing, the motor shaft, and a first stage small gear, the first stage small gear is integrated with the motor shaft and meshes with the first stage large gear;

wherein:

the differential assembly comprises a third stage large gear, an outer differential housing, an inner differential housing, a gear set, and a split clutch, the gear set is provided on the inner differential housing, the third stage large gear is integrated on the outer differential housing, and the inner differential housing is supported inside the outer differential housing by a needle roller bearing, the third stage large gear meshes with the third stage small gear;

the split clutch is provided between the inner differential housing and the outer differential housing, and the inner differential housing and the outer differential housing are locked to move together or separated to move independently by making the split clutch to perform a first or second action.

2. The electric drive axle of claim 1, wherein the reducer assembly further comprises a reducer housing and a reducer cover that are connected by bolts.

3. The electric drive axle of claim 2, further comprising a left axle tube and a right axle tube, wherein the left axle tube is fixedly connected to a left end surface of the motor housing, and the right axle tube is fixedly connected to a right end surface of the reducer cover.

4. The electric drive axle of claim 3, wherein the motor shaft comprises a hollow shaft, and the gear set comprises a left half shaft gear and a right half shaft gear.

5. The electric drive axle of claim 4, further comprising a left output shaft and a right output shaft, wherein the left output shaft is connected to the left half shaft gear through the left axle tube and the hollow shaft, and the right output shaft is connected to the right half shaft gear through the right axle tube.

6. An automobile comprising the electric drive axle of claim 5.

7. An automobile comprising the electric drive axle of claim 4.

8. An automobile comprising the electric drive axle of claim 3.

9. An automobile comprising the electric drive axle of claim 2.

10. The electric drive axle of claim 1, further comprising a parking mechanism, wherein the parking mechanism comprises a parking arm and a parking gear; the parking gear is fixedly connected to the motor shaft and is provided on an outer side of the first stage small gear; the vehicle is controlled to be in a parking or a non-parking state by making the parking arm and the parking gear engage or disengage.

11. An automobile comprising the electric drive axle of claim 10.

12. An automobile comprising the electric drive axle of claim 1.

* * * * *